(12) United States Patent
Park et al.

(10) Patent No.: US 10,720,682 B2
(45) Date of Patent: Jul. 21, 2020

(54) ENCAPSULATION STRUCTURE FOR PREVENTING THERMAL DAMAGE TO BATTERY AND METHOD OF OPERATING THE SAME

(71) Applicant: HYUNDAI MOTOR COMPANY, Seoul (KR)

(72) Inventors: Dang-Hee Park, Seoul (KR); Yong-Beom Park, Gunpo-si (KR); Bong-Soo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 697 days.

(21) Appl. No.: 15/347,085

(22) Filed: Nov. 9, 2016

(65) Prior Publication Data

US 2017/0365896 A1 Dec. 21, 2017

(30) Foreign Application Priority Data

Jun. 16, 2016 (KR) .................. 10-2016-0075074

(51) Int. Cl.
*H01M 10/6562* (2014.01)
*H01M 10/625* (2014.01)
*H01M 10/658* (2014.01)
*H01M 2/10* (2006.01)
*H01M 10/613* (2014.01)

(52) U.S. Cl.
CPC ..... *H01M 10/6562* (2015.04); *H01M 2/1072* (2013.01); *H01M 2/1094* (2013.01); *H01M 10/613* (2015.04); *H01M 10/625* (2015.04); *H01M 10/658* (2015.04); *H01M 2220/20* (2013.01)

(58) Field of Classification Search
CPC combination set(s) only.
See application file for complete search history.

(56) References Cited

U.S. PATENT DOCUMENTS

| 5,212,025 | A | * | 5/1993 | Shibata | ................. | H01M 2/024 |
| | | | | | | 429/120 |
| 2002/0112494 | A1 | * | 8/2002 | Harth | ..................... | B60L 58/33 |
| | | | | | | 62/239 |
| 2006/0211364 | A1 | * | 9/2006 | Brotz | ..................... | B60K 11/08 |
| | | | | | | 454/261 |
| 2008/0160360 | A1 | * | 7/2008 | Fennimore | ........ | H01M 8/04179 |
| | | | | | | 429/414 |
| 2010/0273042 | A1 | * | 10/2010 | Buck | ..................... | H01M 2/024 |
| | | | | | | 429/120 |

(Continued)

FOREIGN PATENT DOCUMENTS

| JP | 08-501655 A | 2/1996 |
| JP | 09-177552 A | 7/1997 |

(Continued)

*Primary Examiner* — Amanda J Barrow
(74) *Attorney, Agent, or Firm* — Morgan, Lewis & Bockius LLP

(57) ABSTRACT

An encapsulation structure for preventing thermal damage to a battery includes a cooling module air guide formed on a front outer peripheral surface of a cooling module so as to protrude in a forward direction of a vehicle; an outside air line communicating with the cooling module air guide such that outside air flowing into the cooling module air guide is introduced through the outside air line; and a battery case formed to enclose the battery. The battery case communicates with the outside air line.

15 Claims, 10 Drawing Sheets

(56) References Cited

U.S. PATENT DOCUMENTS

| | | | | |
|---|---|---|---|---|
| 2012/0085510 A1* | 4/2012 | Kim | ............... | B60K 11/02 |
| | | | | 165/44 |
| 2013/0133963 A1* | 5/2013 | Ajisaka | ............ | B60K 11/04 |
| | | | | 180/68.1 |
| 2013/0196199 A1* | 8/2013 | Lee | ............. | H01M 2/1072 |
| | | | | 429/83 |
| 2015/0221899 A1* | 8/2015 | Knapp | ........... | H01M 2/0262 |
| | | | | 429/176 |
| 2016/0072163 A1* | 3/2016 | Tsuruta | .......... | H01M 10/658 |
| | | | | 429/156 |
| 2017/0349040 A1* | 12/2017 | Nagaosa | ........... | B60L 50/50 |
| 2018/0086198 A1* | 3/2018 | Maeda | ............. | B60K 11/06 |

FOREIGN PATENT DOCUMENTS

| | | | |
|---|---|---|---|
| JP | 2004-127926 A | 4/2004 | |
| KR | 10-2001-0046872 A | 6/2001 | |
| KR | 10-2006-0068931 A | 6/2006 | |
| KR | 10-2006-0068931 | * 11/2010 | ......... H01M 10/625 |
| KR | 10-2012-0035735 A | 4/2012 | |
| KR | 10-2013-0033579 A | 4/2013 | |
| KR | 10-2015-0071751 A | 6/2015 | |

* cited by examiner

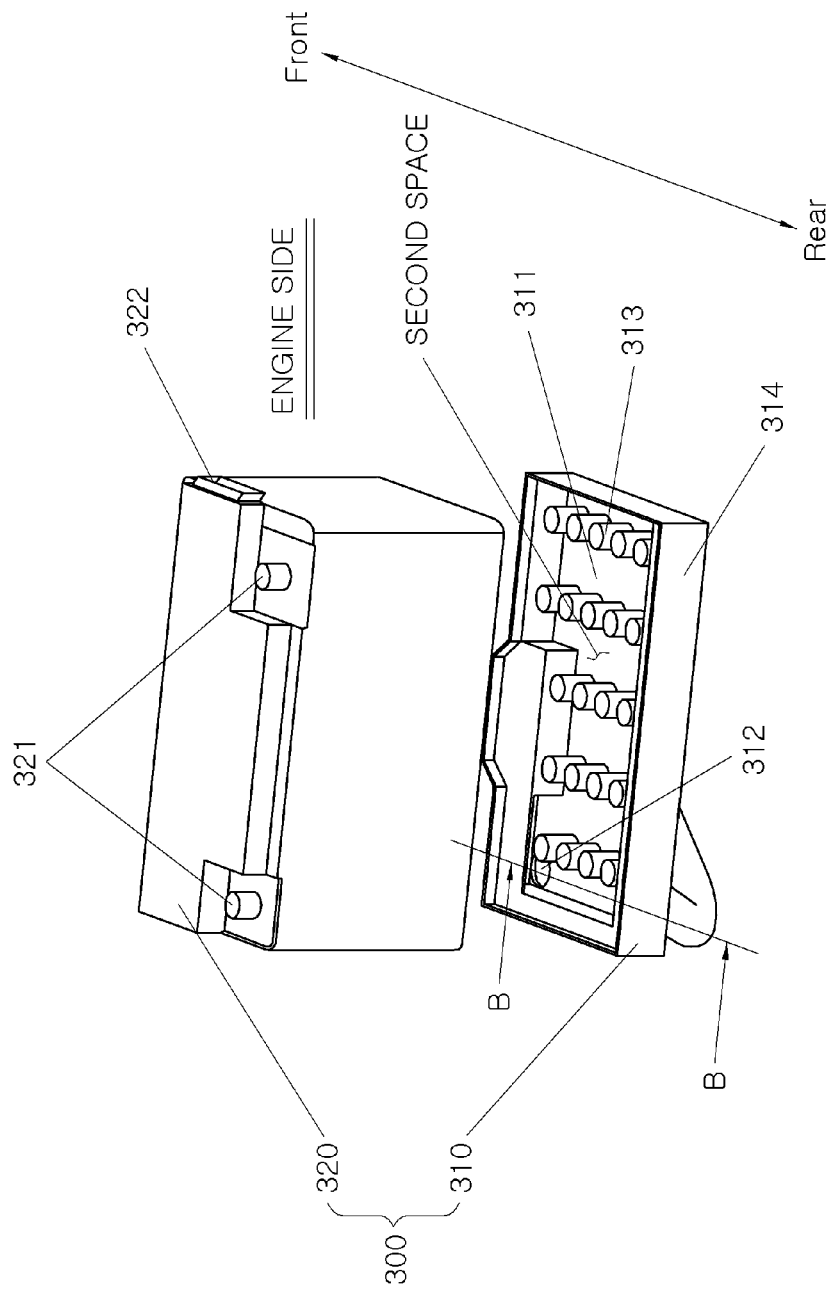

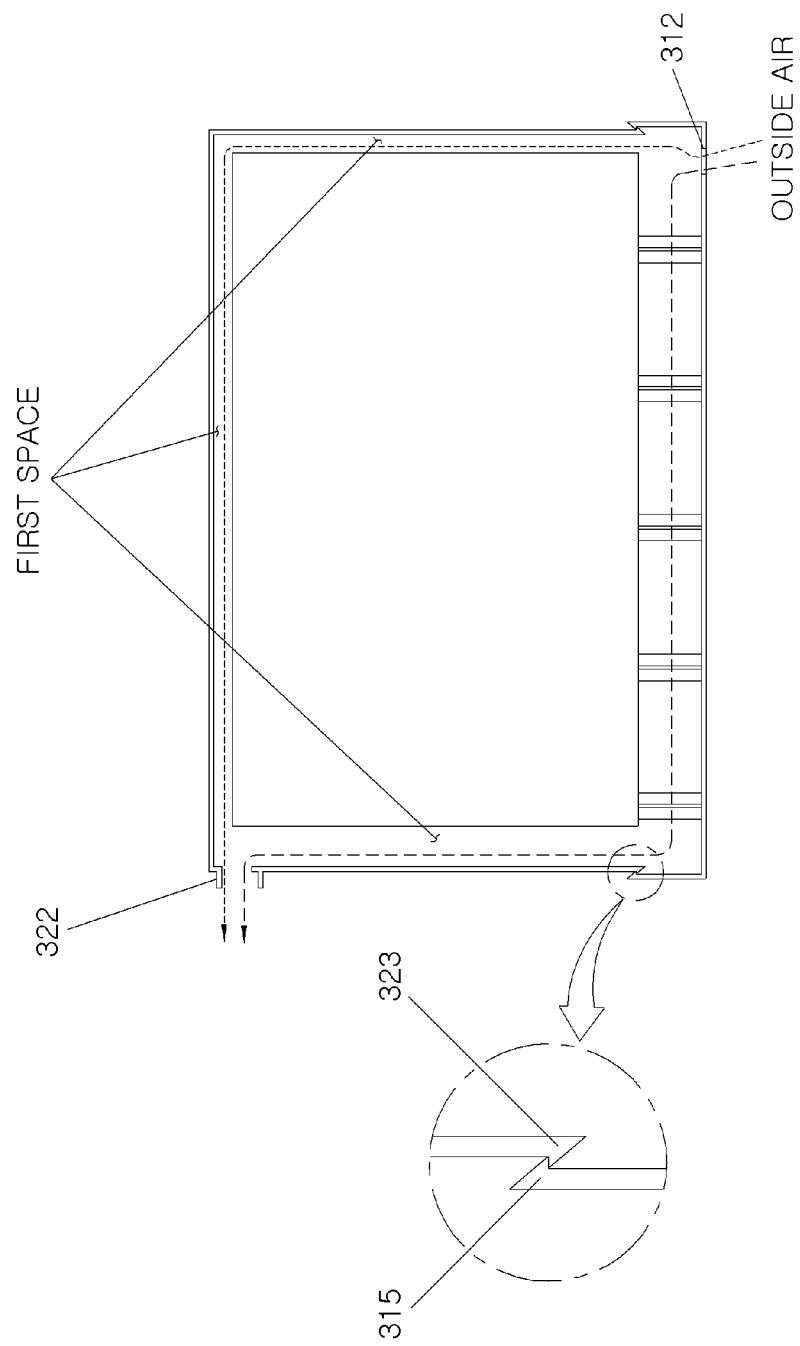

B-B CROSS-SECTION

OUTSIDE AIR

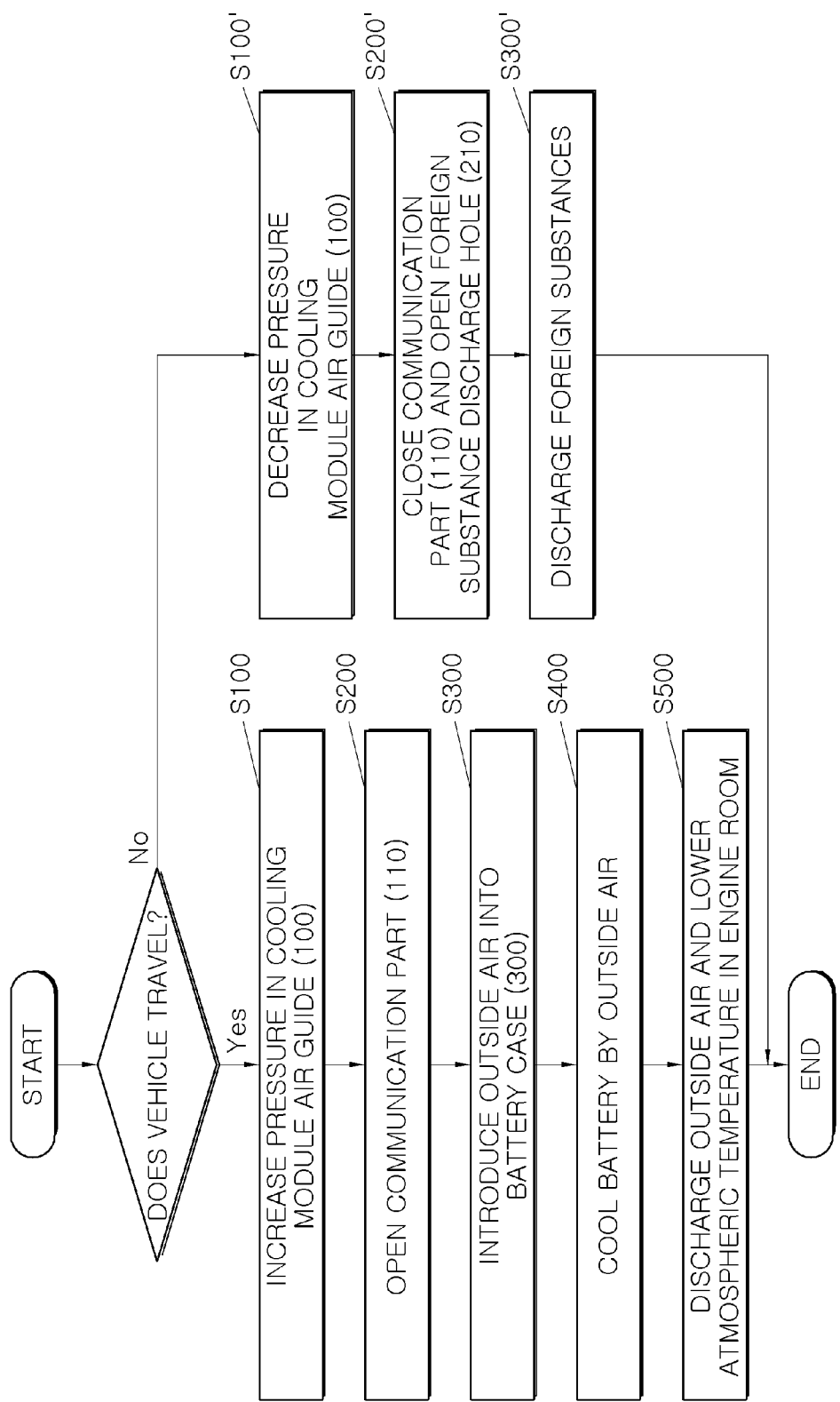

ENCAPSULATION STRUCTURE FOR PREVENTING THERMAL DAMAGE TO BATTERY AND METHOD OF OPERATING THE SAME

CROSS-REFERENCE(S) TO RELATED APPLICATIONS

This application claims the benefit of priority to Korean Patent Application No. 10-2016-0075074, filed on Jun. 16, 2016 in the Korean Intellectual Property Office, the entirety of which is incorporated herein by reference.

TECHNICAL FIELD

Exemplary embodiments in the present disclosure relate to an encapsulation structure for preventing thermal damage to a battery and a method of operating the same; and, particularly, to an encapsulation structure for preventing thermal damage to a battery, capable of effectively cooling a battery, which radiates heat by itself, while preventing degradation of aerodynamic performance of a vehicle, since a separate duct is not formed in the forward direction of the vehicle, and a method of operating the same.

BACKGROUND

The service lives of vehicle batteries are influenced by the ambient temperatures of the batteries as well as the radiation temperatures of the batteries themselves.

In particular, a 12V battery disposed in an engine compartment has a limited service life because the periphery of the battery is exposed to high temperature (80° C. or more) in the engine compartment. The temperature in the engine compartment has been generally increasing as well due to the increase in engine power and the enlargement of turbo engines.

In order to prevent the life or performance of a battery disposed in an engine compartment from deteriorating due to the increase in the temperature thereof (i.e. in order to prevent thermal damage to the battery) in the related art, a cover made of a heat-resistant material may be installed to enclose the whole battery and shield it from the engine (see FIG. 1). However, the cover also blocks the radiation of heat from the battery itself to the outside, and hence increases the temperature of the battery. For this reason, the performance of the battery may be degraded.

In addition, in order to introduce outside air into the battery and cool the battery in the related art, a separate duct is installed such that the battery communicates with the front of the vehicle through the duct. However, because the amount of outside air introduced into the vehicle is increased due to the formation of the duct, there are problems in that the aerodynamic performance of the vehicle is degraded and fuel efficiency is hence degraded. Moreover, since a greater radiator grille must be formed at the front of the vehicle due to the duct, there is a problem in that design constraints occur.

SUMMARY

An exemplary embodiment in the present disclosure is directed to an encapsulation structure for preventing thermal damage to a battery, capable of introducing surplus outside air, which does not flows into a radiator, into a battery by installing an air guide at the front end of a cooling module.

Other objects and advantages of the present disclosure can be understood by the following description, and become apparent with reference to the exemplary embodiments described herein. Also, it is obvious to those skilled in the art to which the present disclosure pertains that the objects and advantages of the present disclosure can be realized by the means as claimed and combinations thereof.

In accordance with an exemplary embodiment in the present disclosure, an encapsulation structure for preventing thermal damage to a battery includes a cooling module air guide formed on a front outer peripheral surface of a cooling module so as to protrude in a forward direction of a vehicle, an outside air line communicating with one side of the cooling module air guide so that a portion of outside air flowing into the cooling module air guide is introduced through the outside air line, and a battery case formed to enclose a battery, one lower side thereof communicating with the outside air line.

The cooling module air guide may include a communication hole formed on one surface thereof so as to communicate with the outside air line.

The cooling module air guide may further include an outside air introduction plug to open or close the communication hole communicating with the outside air line.

The cooling module air guide may further include a spring hinge allowing to the outside air introduction plug to be rotatably mounted to the cooling module air guide such that the outside air introduction plug opens or closes the communication hole.

The outside air line may include a foreign substance discharge hole formed on a lower surface thereof so that foreign substances contained in outside air are discharged through the foreign substance discharge hole.

When the communication hole is opened, the foreign substance discharge hole may be closed by the outside air introduction plug, and when the communication hole (110) is closed, the foreign substance discharge hole may be opened from the outside air introduction plug.

The battery case may include a battery tray on which the battery is seated, and an encapsulation cover configured to enclose the battery while being spaced apart from side and upper surfaces of the battery by a predetermined distance to define a space (a first space), a lower end of the encapsulation cover being fastened to the battery tray.

The battery tray may include a flat lower surface, and an inlet hole formed on one side of the lower surface so as to communicate with the outside air line.

The battery tray may further include a plurality of protruding-seating parts protruding upward from the lower surface, the battery may be seated on the protruding-seating parts, and the protruding-seating parts may be spaced apart from each other by a predetermined distance to define a space (a second space) in which outside air introduced into the inlet hole flows.

The battery tray may further include a frame part protruding upward from an outer peripheral portion of the lower surface, to prevent the outside air from flowing out of the battery tray.

The battery tray may further include a first protruding part having a wedge shape that is directed upward so as to protrude inward from an upper end of the frame part.

The encapsulation cover may include a battery terminal protruding part formed on an upper surface thereof for protruding of a terminal of the battery.

The encapsulation cover may further include an outlet hole formed on a side surface thereof to be opened toward an engine, so that outside air is discharged through the outlet hole.

The encapsulation cover may further include a second protruding part having a wedge shape that is directed downward so as to protrude outward from a side lower end of the encapsulation cover.

The encapsulation cover may be made of a single material having heat insulation and elasticity.

The encapsulation cover may be made of a composite material in which heat-insulating material is attached around polypropylene having heat insulation and elasticity.

The heat-insulating material may be attached around the polypropylene using one of bonding, spraying, and coating.

In accordance with another embodiment of the present invention, a method of operating an encapsulation structure for preventing thermal damage to a battery includes increasing a pressure in a cooling module air guide due to an amount of outside air introduced into the cooling module air guide being larger than an amount of outside air passing through a cooling module by travelling wind when a vehicle travels, opening a communication hole by an outside air introduction plug when the pressure in the cooling module air guide exceeds a predetermined reference pressure, introducing the outside air in the cooling module air guide into a battery case through an outside air line and an inlet hole, cooling a lower surface of a battery while the outside air in the battery case passes through a second space, and then cooling side and upper surfaces of the battery while the outside air passes through a first space, and discharging the outside air in the battery case through an outlet hole and lowering an atmospheric temperature in an engine compartment.

The method may further include decreasing the pressure in the cooling module air guide when the vehicle is stopped, closing the communication hole by the outside air introduction plug and opening a foreign substance discharge hole, when the pressure in the cooling module air guide is equal to or less than the predetermined reference pressure, and discharging foreign substances in the outside air line through the foreign substance discharge hole by gravity.

BRIEF DESCRIPTION OF THE DRAWINGS

FIG. 5 is an exploded perspective view illustrating a battery case according to an exemplary embodiment.

FIG. 6 is a vertical cross-sectional view illustrating the battery case according to an exemplary embodiment.

FIG. 8 is a flowchart illustrating a method of operating an encapsulation structure for preventing thermal damage to a battery according to another exemplary embodiment in the present disclosure.

DETAILED DESCRIPTION OF THE EMBODIMENTS

It is noted that the terms and words used in the present specification and claims should not be construed as being limited to common or dictionary meanings but instead should be understood to have meanings and concepts in agreement with the spirit of the present disclosure based on the principle that an inventor can define the concept of each term suitably in order to describe his/her own invention in the best way possible. Accordingly, since the embodiments described in the present specification are nothing but exemplary embodiments and it does not cover all the technical ideas of the disclosure, it should be understood that various changes and modifications may be made at the time of filing the present application. In certain embodiments, detailed descriptions of device constructions or processes well known in the art may be omitted to avoid obscuring appreciation of the disclosure by a person of ordinary skill in the art. Reference will now be made in detail to exemplary embodiments in the present disclosure, examples of which are illustrated in the accompanying drawings.

Figure 1:
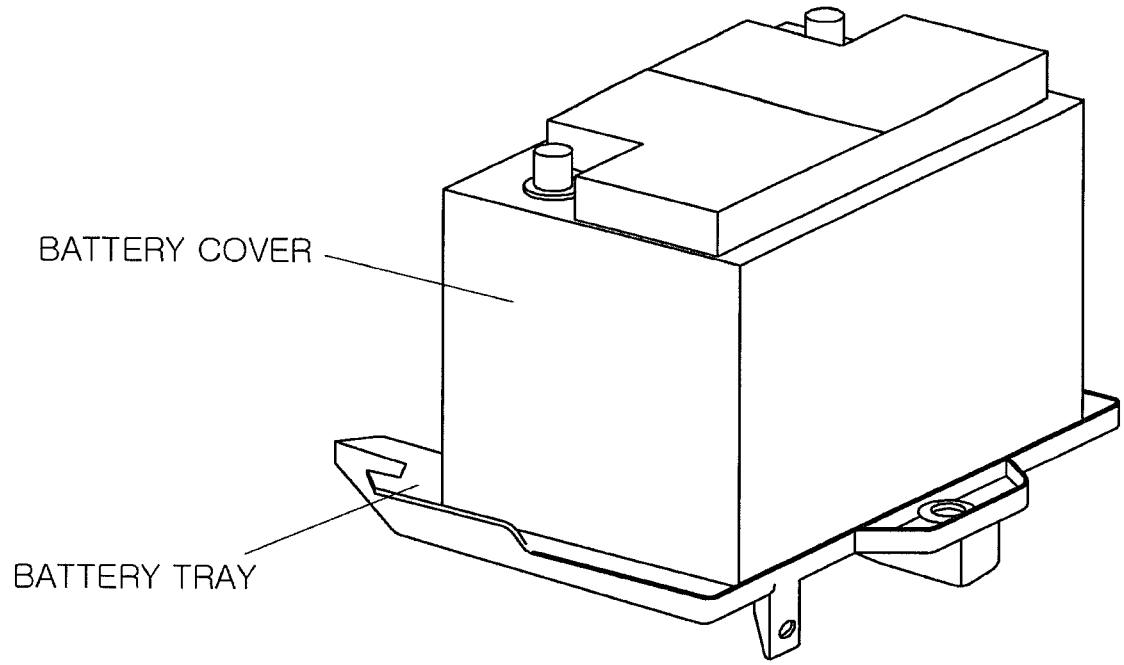
FIG. 1 is a view illustrating an example of a battery tray and a battery cover according to the related art.
Figure 2:
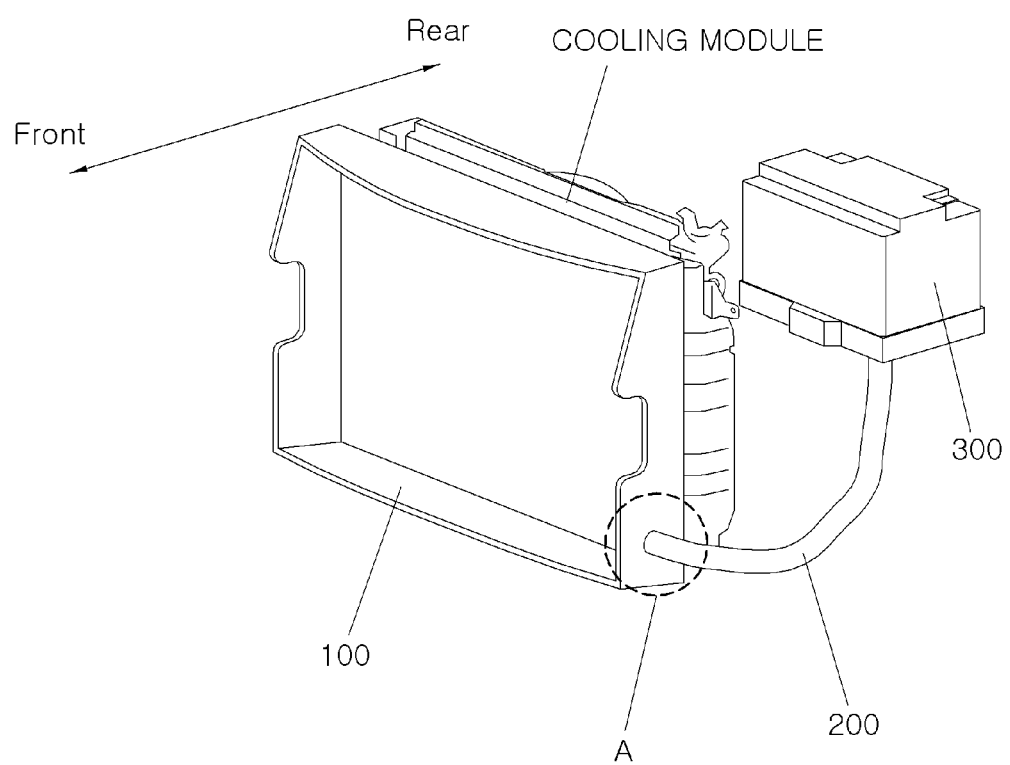
FIGS. 2 and 3 are perspective views illustrating an encapsulation structure for preventing thermal damage to a battery according to an exemplary embodiment in the present disclosure.
Figure 3:
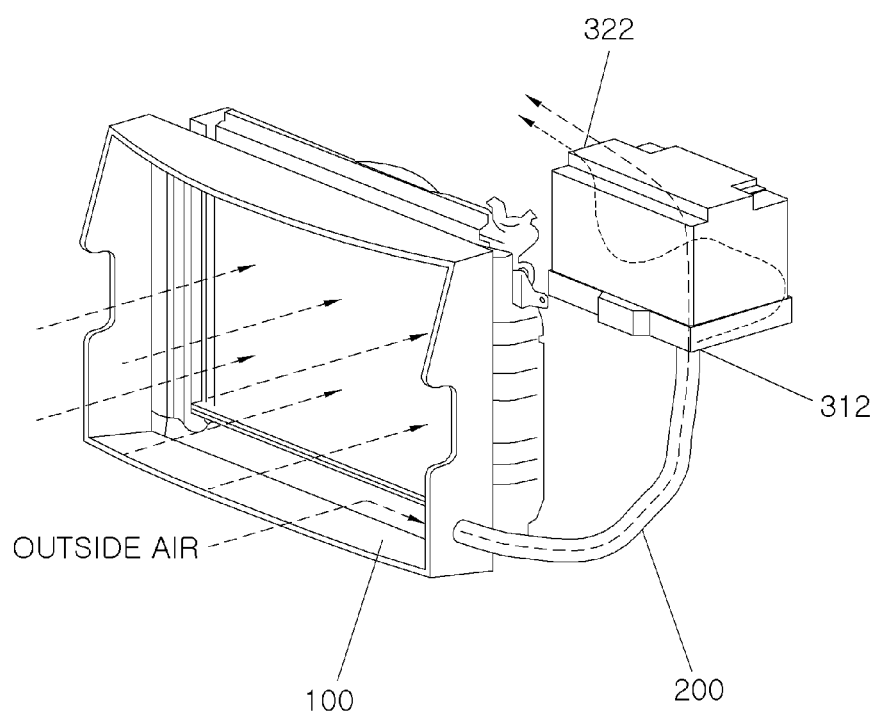
Figure 4A:
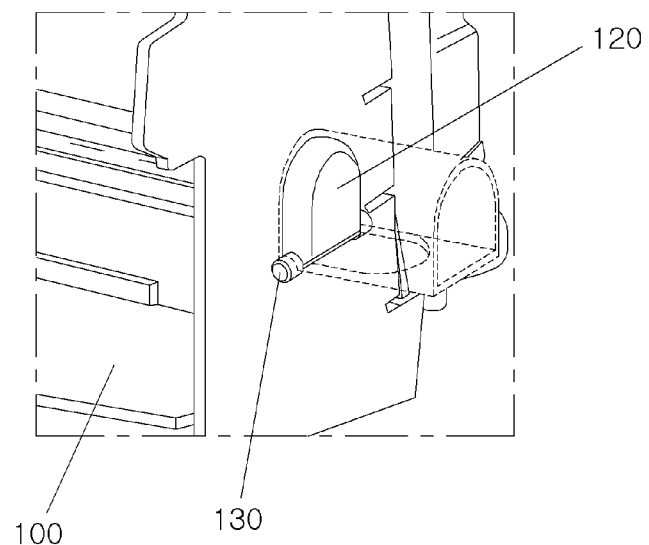
FIGS. 4A to 4C are enlarged views of portion "A" of FIG. 2 and views illustrating the operation state of the encapsulation structure.
Figure 4B:
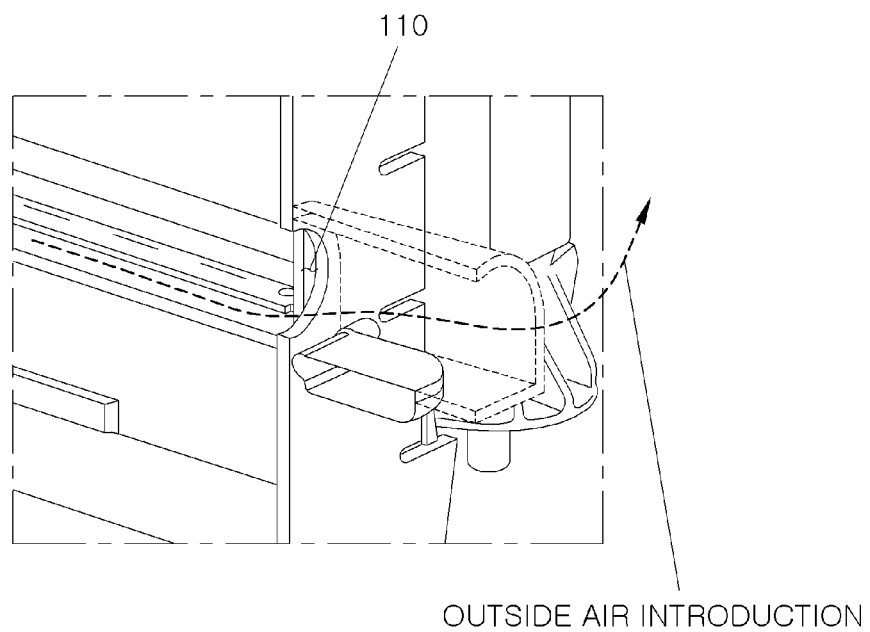
Figure 4C:
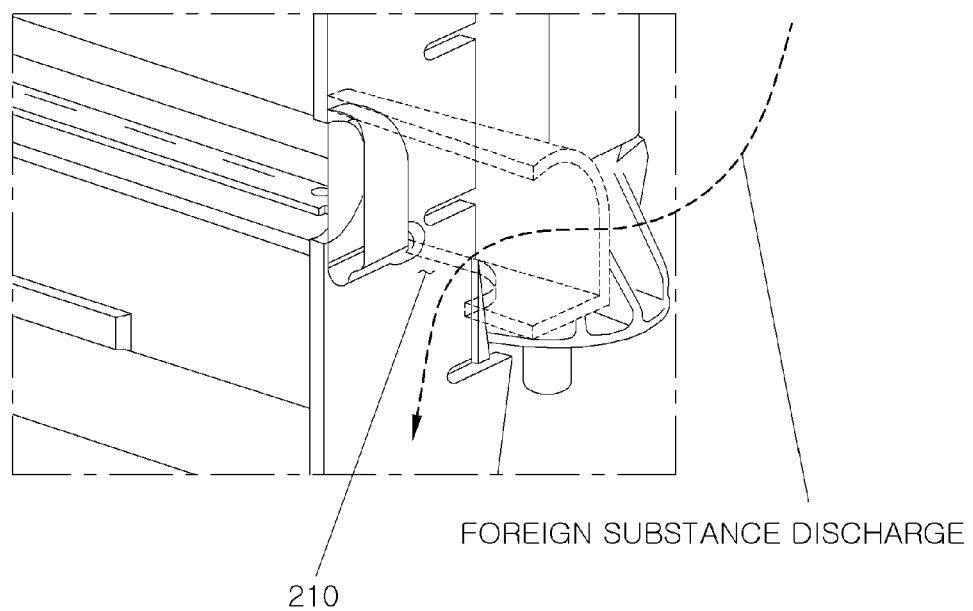
Figure 7:
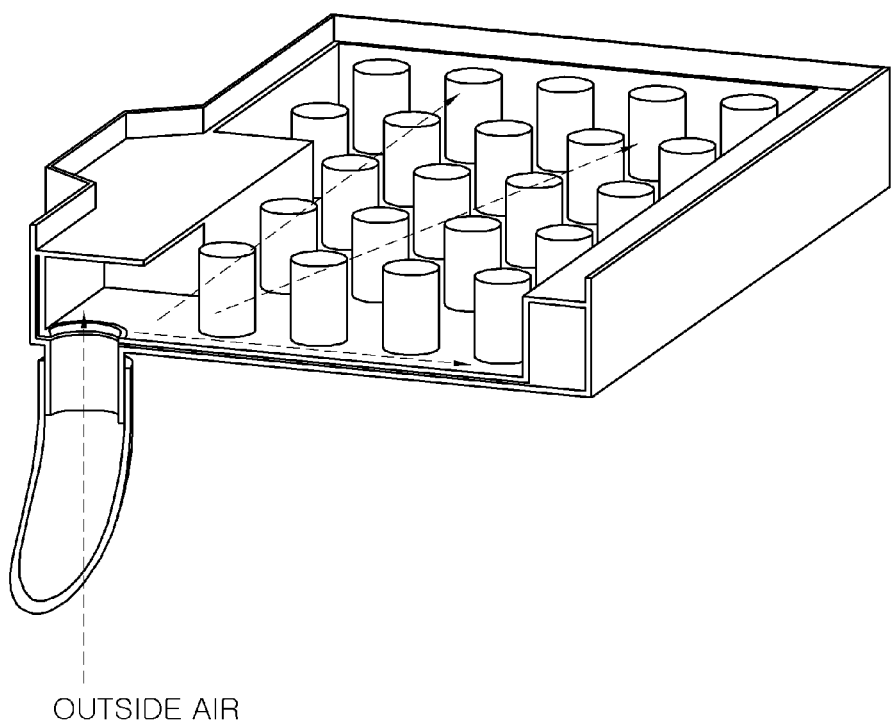
FIG. 7 is a cross-sectional view taken along line B-B of FIG. 5.

FIGS. 2 and 3 are perspective views illustrating an encapsulation structure for preventing thermal damage to a battery according to an exemplary embodiment in the present disclosure. FIGS. 4A to 4C are enlarged views of portion "A" of FIG. 2 and views illustrating the operation state of the encapsulation structure. FIG. 5 is an exploded perspective view illustrating a battery case according to the present exemplary embodiment. FIG. 6 is a vertical cross-sectional view illustrating the battery case according to the present exemplary embodiment. FIG. 7 is a cross-sectional view taken along line B-B of FIG. 5. Referring to FIGS. 2 to 7, the encapsulation structure for preventing thermal damage to a battery according to an exemplary embodiment in the present disclosure includes a cooling module air guide 100, an outside air line 200, and a battery case 300.

The cooling module air guide 100 is formed on the front outer peripheral surface of a cooling module so as to protrude in the forward direction of the vehicle. The cooling module air guide 100 includes a communication hole 110, an outside air introduction plug 120, and a spring hinge 130. In this case, the communication hole 110 is formed on one surface of the cooling module air guide 100 such that the cooling module air guide 100 communicates with the outside air line 200 through the communication hole 110. The outside air introduction plug 120 serves to open or close the communication hole 110. In addition, the spring hinge 130 serves to mount the outside air introduction plug 120 to the cooling module air guide 100 such that the outside air introduction plug 120 may open or close the communication hole 110.

In the related art, when the amount of outside air introduced into the cooling module is larger than the amount of outside air passing through the cooling module by travelling wind when the vehicle travels, the outside air by the difference therebetween stays in the front end of the cooling module and the pressure thereof is increased. Eventually, the outside air is not introduced into the cooling module. However, in the present exemplary embodiment, when the amount of outside air introduced into the cooling module air guide 100 is larger than the amount of outside air passing through the cooling module by travelling wind when the vehicle travels, the outside air by the difference therebetween passes through the communication hole 110 and flows into the outside air line 200. Accordingly, surplus outside air may be introduced into the outside air line 200 without degradation of aerodynamic performance of the vehicle.

In this case, when the amount of outside air introduced into the cooling module is equal to the amount of outside air passing through the cooling module by travelling wind when the vehicle travels, the outside air introduction plug 120 is mounted to prevent the amount of outside air passing through the cooling module from decreasing. The outside air introduction plug 120 is coupled to the cooling module air guide 100 by the spring hinge 130. Therefore, the outside air introduction plug 120 opens the communication hole 110 only when the pressure in the cooling module air guide 100 is equal to or greater than a reference pressure. The reference pressure may be set differently according to a designer's intention, and the elastic force of the spring hinge 130 may also be set differently according to the reference pressure.

The outside air line 200 is a line which communicates with one side of the cooling module air guide 100 so that a portion of the outside air flowing into the cooling module air guide 100 is introduced through the outside air line 200. In addition, the outside air line 200 includes a foreign substance discharge hole 210. The foreign substance discharge hole 210 is formed on the lower surface of the outside air line 200 and serves to discharge foreign substances contained in outside air. That is, the foreign substance discharge hole 210 is formed to discharge foreign substances such as dust which may be contained in the outside air.

In more detail, when the communication hole 110 is opened, the foreign substance discharge hole 210 is closed by the outside air introduction plug 120. When the communication hole 110 is closed, the foreign substance discharge hole 210 is opened from the outside air introduction plug 120.

That is, when the amount of outside air introduced into the cooling module air guide 100 is larger than the amount of outside air passing through the cooling module by travelling wind when the vehicle travels (e.g. when the vehicle travels at high speed), the pressure in the cooling module air guide 100 is increased, in which case when it exceeds the elastic force of the spring hinge 130, the outside air introduction plug 120 opens the communication hole 110. At the same time, the outside air introduction plug 120 closes the foreign substance discharge hole 210 formed on the lower surface of the outside air line 200, with the consequence that outside air is not discharged to the foreign substance discharge hole 210, but is fully introduced into the battery case 300. The foreign substance discharge hole 210 is formed with a first stepped portion (not shown) so as to prevent the outside air introduction plug 120 from rotating beyond a position where it closes the foreign substance discharge hole 210.

In addition, when the amount of outside air introduced into the cooling module air guide 100 is smaller than the amount of outside air passing through the cooling module by travelling wind when the vehicle travels (e.g. when the vehicle is idle), the pressure in the cooling module air guide 100 is decreased, in which case when it is lower than the elastic force of the spring hinge 130, the outside air introduction plug 120 closes the communication hole 110. The communication hole 110 is formed with a second stepped portion (not shown) so as to prevent the outside air introduction plug 120 from rotating beyond a position where it closes the communication hole 110. At the same time, the outside air introduction plug 120 opens the foreign substance discharge hole 210 formed on the lower surface of the outside air line 200, with the consequence that foreign substances (e.g. dust) introduced into the outside air line 200 is discharged to the outside therefrom by gravity.

The battery case 300 is formed to enclose the battery, and one lower side thereof communicates with the outside air line 200. The battery case 300 includes a battery tray 310 and an encapsulation cover 320.

The battery tray 310 is a component on which the battery is seated, and includes a flat lower surface 311, and an inlet hole 312 formed on one side of the lower surface 311 such that the battery tray 310 communicates with the outside air line 200 through the inlet hole 312.

In addition, the battery tray 310 includes protruding-seating parts 313, a frame part 314, and a first protruding part 315. The protruding-seating parts 313 protrude upward from the lower surface 311, and the battery is seated on the protruding-seating parts 313. The protruding-seating parts 313 are spaced apart from each other by a predetermined distance, and define a space (second space) in which the outside air introduced into the inlet hole 312 flows. That is, the outside air passing through the outside air line 200 is introduced into the battery case 300 through the inlet hole 312, and cools the lower surface of the battery while passing through the second space.

The frame part 314 protrudes upward from the outer peripheral portion of the lower surface 311, and serves to prevent the outside air from flowing out of the battery tray 310. In addition, the first protruding part 315 has a wedge shape that is directed upward so as to protrude inward from the upper end of the frame part 314. The first protruding part 315 is fastened to a second protruding part 323, which will be described later, and serves to fasten the battery tray 310 to the encapsulation cover 320.

The encapsulation cover 320 encloses the battery while being spaced apart from the side and upper surfaces of the battery by a predetermined distance to define a space (first space), and the lower end of the encapsulation cover 320 is fastened to the battery tray 310. The encapsulation cover 320 includes battery terminal protruding parts 321, an outlet hole 322, and a second protruding part 323.

The battery terminal protruding parts 321 are formed on the upper surface of the encapsulation cover 320 such that the terminals of the battery protrude through the battery terminal protruding parts 321. The outlet hole 322 is opened toward the engine and is formed on the side surface of the encapsulation cover 320 such that outside air is discharged through the outlet hole 322. Accordingly, the outside air passing through the second space cools the side and upper surfaces of the battery while passing through the first space.

In addition, the outside air passing through the first space is not discharged to the outside of the vehicle, but is discharged into the engine compartment through the outlet hole 322. Since the inside of the engine compartment has a high temperature, it can be sufficiently cooled by the outside air passing through the first space. Thus, the temperature in the engine compartment can be further lowered through the application of the present exemplary embodiment. In more detail, the outside air introduced into the battery case 300 in the present exemplary embodiment is outside air which stayed in the cooling module or did not flow into the vehicle due to staying therein in the related art. However, since the outside air may be introduced into the engine compartment through the application of the present exemplary embodiment, it is possible to lower the temperature in the engine compartment, unlike the related art.

In addition, the second protruding part 323 may have a wedge shape that is directed downward so as to protrude outward from the side lower end of the encapsulation cover 320. The second protruding part 323 is fastened to the first protruding part 315, and serves to fasten the battery tray 310 to the encapsulation cover 320. In this case, the battery tray 310 may be easily fastened to the encapsulation cover 320, and therefore it is possible to reduce the number of working processes and thus to enhance the productivity of the vehicle.

The encapsulation cover 320 may be made of a single material having heat insulation and elasticity, or it may be made of a composite material in which heat-insulating material is attached around polypropylene having heat insulation and elasticity. The composite material may be made in such a way so as to attach heat-insulating material around polypropylene using one of bonding, spraying, and coating.

FIG. 8 is a flowchart illustrating a method of operating an encapsulation structure for preventing thermal damage to a battery according to another exemplary embodiment in the present disclosure. Referring to FIG. 8, the method of operating an encapsulation structure for preventing thermal damage to a battery according to the present exemplary embodiment includes an increasing step (S100), an opening step (S200), an introducing step (S300), a cooling step (S400) and a lowering step (S500).

In increasing step S100, the amount of outside air introduced into cooling module air guide 100 is larger than the amount of outside air passing through a cooling module by travelling wind when the vehicle travels, and thus the pressure in the cooling module air guide 100 is increased.

In opening step S200, when the pressure in the cooling module air guide 100 exceeds a predetermined reference pressure, outside air introduction plug 120 opens communication hole 110. That is, since the outside air introduction plug 120 is coupled to the cooling module air guide 100 by a spring hinge 130, the outside air introduction plug 120 opens the communication hole 110 only when the pressure in the cooling module air guide 100 is equal to or greater than the predetermined reference pressure.

In introducing step S300, the outside air in the cooling module air guide 100 is introduced into battery case 300 through outside air line 200 and inlet hole 312.

In cooling step S400, the outside air in the battery case 300 cools the lower surface of the battery while passing through a second space, and then cools the side and upper surfaces of the battery while passing through a first space.

In lowering step S500, the outside air in the battery case 300 is discharged through outlet hole 322, and lowers the temperature in the engine compartment.

In addition, the method of operating an encapsulation structure for preventing thermal damage to a battery includes a decreasing step (S100'), an opening step (S200'), and a discharging step (S300').

In decreasing step S100', the pressure in the cooling module air guide 100 is decreased when the vehicle is stopped. In opening step S200', when the pressure in the cooling module air guide 100 is equal to or less than the predetermined reference pressure, the outside air introduction plug 120 opens a foreign substance discharge hole 210 while closing the communication hole 110. Thus, the outside air introduced by fan wind of the vehicle is fully introduced into the cooling module, and is used to cool high-temperature coolant passing through the cooling module.

In discharging step S300', foreign substances in the outside air line 200 are discharged through the foreign substance discharge hole 210 by gravity. That is, foreign substances, which may be contained in outside air introduced into the outside air line 200, are discharged out of the outside air line 200.

In accordance with the exemplary embodiments in the present disclosure, since a separate duct is not formed in the forward direction of a vehicle, it is possible to effectively cool a battery, which radiates heat by itself, while preventing the aerodynamic performance of the vehicle from deteriorating.

In addition, since the encapsulation structure is configured to insulate the whole battery from heat sources such as the engine, it is possible to prevent the heating of the battery due to external heat sources.

While the present invention has been described with respect to the specific embodiments, it will be apparent to those skilled in the art that various changes and modifications may be made without departing from the spirit and scope of the invention as defined in the following claims.

What is claimed is:

1. An encapsulation structure for preventing thermal damage to a battery, comprising:
    a cooling module air guide disposed on a front outer peripheral surface of a cooling module so as to protrude in a forward direction of a vehicle;
    an outside air line communicating with the cooling module air guide such that outside air flowing into the cooling module air guide is introduced through the outside air line; and
    a battery case configured to enclose the battery, wherein the battery case communicates with the outside air line,
    wherein the cooling module air guide comprises:
        a communication hole defined in one surface of the cooling module air guide so as to communicate with the outside air line;
        an outside air introduction plug configured to open or close the communication hole; and
        a spring hinge allowing the outside air introduction plug to be rotatably mounted to the cooling module air guide such that the outside air introduction plug is configured to open or close the communication hole by a pressure in the cooling module air guide.

2. The encapsulation structure of claim 1, wherein the cooling module air guide further comprises a spring hinge allowing the outside air introduction plug to be rotatably mounted to the cooling module air guide such that the outside air introduction plug opens or closes the communication hole.

3. The encapsulation structure of claim 1, wherein the outside air line comprises a foreign substance discharge hole defined in a lower surface thereof such that foreign substances contained in outside air are discharged through the foreign substance discharge hole.

4. The encapsulation structure of claim 3, wherein the foreign substance discharge hole is closed by the outside air introduction plug when the communication hole is opened, and
    wherein the foreign substance discharge hole is opened from the outside air introduction plug when the communication hole is closed.

5. The encapsulation structure of claim 1, wherein the battery case comprises:
    a battery tray on which the battery is seated; and
    an encapsulation cover enclosing the battery while being spaced apart from side and upper surfaces of the battery to define a first space, a lower end of the encapsulation cover being fastened to the battery tray.

6. The encapsulation structure of claim 5, wherein the battery tray comprises:
    a flat lower surface; and
    an inlet hole defined in one side of the lower surface so as to communicate with the outside air line.

7. The encapsulation structure of claim 6, wherein the battery tray further comprises a plurality of protruding-seating parts protruding upward from the lower surface,
    wherein the battery is seated on the protruding-seating parts, and wherein the protruding-seating parts are spaced apart from each other to define a second space in which outside air introduced into the inlet hole flows.

8. The encapsulation structure of claim 7, wherein the battery tray further comprises a frame part protruding upward from an outer peripheral portion of the lower surface to prevent outside air from flowing out of the battery tray.

9. The encapsulation structure of claim 8, wherein the battery tray further comprises a first protruding part having a wedge shape that is directed upward so as to protrude inward from an upper end of the frame part.

10. The encapsulation structure of claim 5, wherein the encapsulation cover comprises a battery terminal protruding part disposed on an upper surface thereof.

11. The encapsulation structure of claim 10, wherein the encapsulation cover further comprises an outlet hole defined in a side surface thereof to be opened toward an engine, such that the outside air is discharged through the outlet hole.

12. The encapsulation structure of claim 11, wherein the encapsulation cover further comprises a second protruding part having a wedge shape that is directed downward so as to protrude outward from a side lower end of the encapsulation cover.

13. The encapsulation structure of claim 5, wherein the encapsulation cover is composed of a single material having heat insulation and elasticity.

14. The encapsulation structure of claim 5, wherein the encapsulation cover is composed of a composite material in which heat-insulating material is attached around polypropylene.

15. The encapsulation structure of claim 14, wherein the heat-insulating material is attached around the polypropylene using bonding, spraying or coating.

* * * * *